Dec. 21, 1954  J. L. STERISS  2,697,395
FRANKFURTER GRILL
Filed July 27, 1953  3 Sheets-Sheet 1
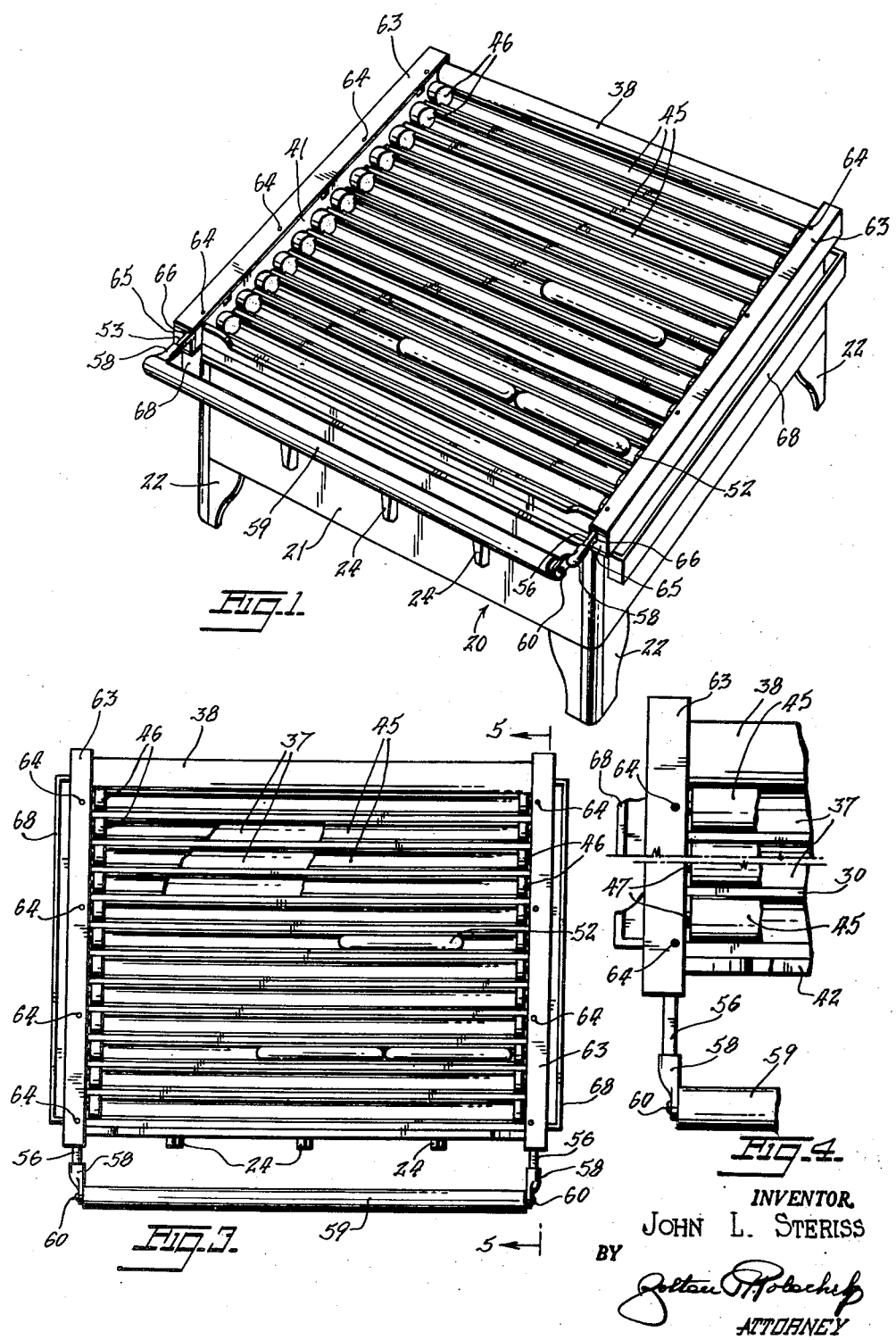
INVENTOR.
JOHN L. STERISS
BY
ATTORNEY

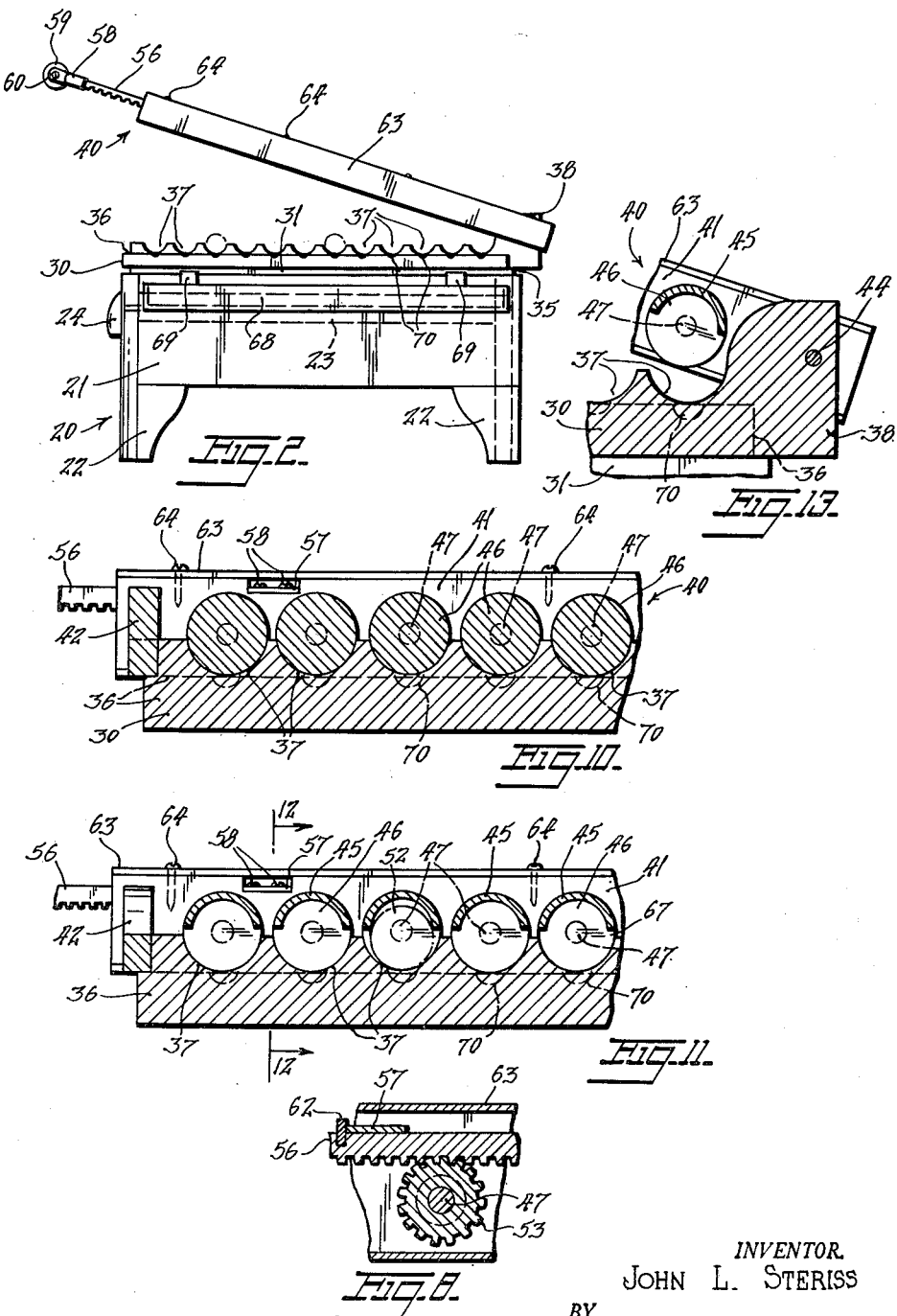

Dec. 21, 1954  J. L. STERISS  2,697,395
FRANKFURTER GRILL
Filed July 27, 1953  3 Sheets-Sheet 3
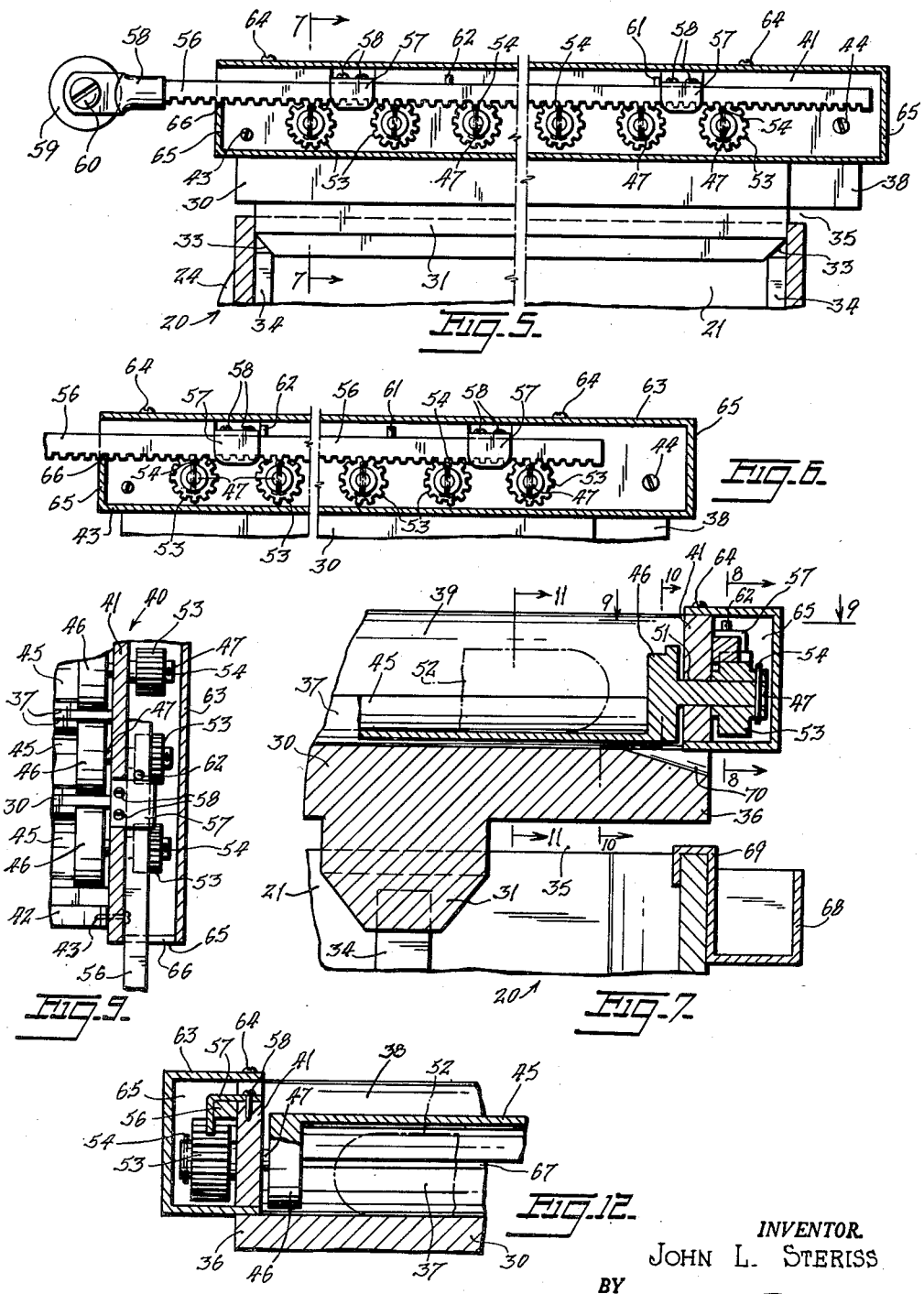
INVENTOR.
JOHN L. STERISS
BY
ATTORNEY

United States Patent Office 2,697,395
Patented Dec. 21, 1954

2,697,395

FRANKFURTER GRILL

John L. Steriss, New York, N. Y.

Application July 27, 1953, Serial No. 370,473

14 Claims. (Cl. 99—423)

This invention relates to new and useful improvements in a frankfurter grill.

Heretofore, in grilling frankfurters for sale over the counter it has been customary to place the frankfurters one adjacent another on a flat grilling plate which is heated from below and to periodically turn each of the frankfurters by hand to evenly grill the same. That method has been found lacking because of the heat loss requiring more heat and a long time to effect the proper grilling, because of shrinkage resulting from the down drafts of cold air which strike the frankfurters, because of the complete exposure of the frankfurters while grilling to air borne dirt and dust, and because of the time required to hand turn the individual frankfurters which could be put to better use with the result that ofttimes the turning of the frankfurters is completely neglected resulting in burning of the frankfurters.

The present invention proposes the construction of an improved commercial type frankfurter grill which overcomes the objections to the prior art grills by providing for the simple, more positive, faster and better grilling of frankfurters under far better sanitary conditions without disrupting or compelling a changeover from the time tested manner of preparing and servicing frankfurters for immediate consumption.

Still further, the present invention proposes characterizing the present frankfurter grill by a flat grill plate to be mounted over a source of heat and which has its top face provided with parallel transversely extended grooves for ultimately receiving the frankfurters which are to be grilled.

The present invention is further characterized by a frame rested on the flat grill plate and between the sides of which a plurality of substantially semicircular shields are extended to be snugly received within the grooves of the grill plate with their open sides faced upward in a manner to have placed therein the frankfurters which are to be grilled.

As a further object, the present invention proposes the provision of means for turning all of said shields in unison through substantially 180 degrees in a manner to spill the contained frankfurters into the respective grooves and close the tops of the grooves during the grilling operation.

Another object of the present invention proposes pivotally mounting the frame on the flat grill plate at the rear edge thereof in a manner so that the frame with all of the semicircular shields can be pivoted upward off the flat grill plate to expose all of the grooves of the grill plate for convenient cleaning of the same.

A further object of the present invention proposes the construction of a grill of the type disclosed having the following advantages over the prior grills used for the preparation of frankfurters for immediate consumption:

1. Far better, even and faster grilling results—more frankfurter surface in contact with the surfaces of the grill which are hot.

2. Prevents shrinkage of frankfurters—shields in their closed positions prevent down drafts of cold air from striking the frankfurters.

3. More sanitary—shields in their closed position completely cover the frankfurters and keep out dust and dirt.

4. Economy of operation—heat waste nearly completely eliminated with the result that the frankfurters are grilled more quickly using less fuel.

5. Eliminates the need for individually hand turning the frankfurters—opening and closing of the shields causes the frankfurters to be automatically turned.

It is a further object of the present invention to construct a frankfurter grill of the type disclosed which is simple and durable, which is effective for its intended purposes and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the frankfurter grill constructed in accordance with the present invention with the shields shown in their open position and with several frankfurters in position in certain of the shields.

Fig. 2 is a side elevational view of Fig. 1, but with the frame shown in an upwardly pivoted position.

Fig. 3 is a plan view of Fig. 1, but with certain of the shields broken away intermediate of their ends.

Fig. 4 is an enlarged detailed view of a portion of Fig. 3, but with the shields turned to their closed positions.

Fig. 5 is an enlarged partial vertical sectional view taken substantially on the line 5—5 of Fig. 3.

Fig. 6 is a view similar to Fig. 5, but showing a different position of the parts.

Fig. 7 is an enlarged partial transverse vertical sectional view taken on the line 7—7 of Fig. 5.

Fig. 8 is a partial vertical sectional view taken on the line 8—8 of Fig. 7.

Fig. 9 is an enlarged partial horizontal sectional view taken on the line 9—9 of Fig. 7.

Fig. 10 is a partial vertical sectional view taken on the line 10—10 of Fig. 7.

Fig. 11 is a partial vertical sectional view taken on the line 11—11 of Fig. 7.

Fig. 12 is a partial vertical transverse sectional view taken on the line 12—12 of Fig. 11.

Fig. 13 is an enlarged partial vertical sectional view of the grill at the rear thereof showing the frame in a raised pivoted position relative to the grill plate.

The frankfurter grill, according to the present invention, is designed for use over a heater assembly 20 having a metallic box-like body 21 which is open at its top and bottom and which is supported in an elevated position on a counter or the like by suitable legs 22. Supported in a horizontal position within the box-like body 21 slightly below the open top thereof, there is a heater element 23, see Fig. 2, having individual segments, as is generally known in the art to which the present invention pertains, controlled by independent rotative knobs 24 exposed at the outside of the body 21. The construction of the heater element forms no part of the present invention and may be of the type fired by natural, manufactured or bottled gas or of the type which operates on electricity; all within the scope of the present invention.

The grill for supporting the frankfurters during the grilling operation is constructed to include a flat grill plate 30 molded of a non-corrosive heat sensitive metal and which is substantially co-extensive with the open top of the box-like body 21. For the purpose of describing the construction of the grill, the front will be considered that part over the side of the heater assembly at which the control knobs 24 for the heating element 23 are exposed. Extended forwardly and rearwardly along the bottom face of the grill plate 30, there is a pair of depending laterally spaced ribs 31. The ribs are integrally formed with the bottom face of the grill plate 30. The front and rear ends of the ribs 31 are provided with downwardly and inwardly inclined beveled surfaces 33 for resting down on the top ends of complementary vertical support ribs 34. The support ribs 34 are mounted on the inner faces of the front and rear walls of the box-like body 21 of the heater assembly 20, compare Figs. 5 and 7. The relationship between the ribs 31 and the support ribs 34 is such that the grill plate 30 will be supported in a position raised slightly off the top edges of the walls of the box-like body 21 to leave a space 35 between the bottom face of the grill plate 30 and the top edges of the walls of the box-like body 21. The space 35 functions to permit the dissipation of heat and the gases of combustion, in cases where the heater element 23 is gas fired, from the interior of the box-like body 21.

About its front and sides, the grill plate 30 is formed with outwardly extended flanges 36 which are flush with the bottom face of the grill plate and which are of a thickness less than the thickness of the grill plate to have their top faces spaced below the top face of the grill plate. The top face of the grill plate 30 is formed with a plurality of rounded, parallel transversely extended grooves 37 for ultimately receiving the frankfurters which are to be grilled. The grooves 37, as best shown in Figs. 2, 10, 11 and 13, are substantially semicircular in cross-section with each being just slightly less than a complete half circle.

Extended along the rear edge of the grill plate 30 and secured thereto, there is a transversely extended upwardly projected integral flange 38. To smoothly finish the junction of the inner face of the flange 38, where it extends above the top face of the grill plate 30, with the top face of that grill plate, the inner side of the flange is rounded, see Fig. 13.

Bounding the grooved top face of the grill plate 30 and resting on the top faces of the flanges 36, there is a frame 40. The frame 40 is U-shaped in plan and has a pair of side arms 41 which extend along the open ends of the grooves 37 and rest down on the side flanges 36. The front ends of the side arms 41 are joined by an intermediate arm 42. The ends of the intermediate arm 42 are secured to the ends of the side arms 41 by screws 43, see Figs. 5, 6 and 9. The frame 40 being made of metal, the intermediate arm 42 could be alternatively made integral with the front ends of the side arms 41. The rear ends of the side arms 41 are pivotally attached to the ends of the flange 38 by end aligned screws 44, which are turnably passed through holes in the rear ends of the side arms 41 and threaded into the ends of the flange 38. The pivotal attachment of the rear ends of the side arms 41 permits the frame 40 to be raised to the position shown for example in Fig. 2 when desired and for purposes which will become clear as this specification proceeds.

Extended transversely between the inner faces of the side arms 41 of the frame 40, there is a plurality of shields 45. There is one shield 45 for each of the grooves 37 of the grill plate 30. The shields 45 are elongated and of substantially semicircular configuration in cross-section being slightly less than one-half a complete circle. The shields are made of non-corrosive heat sensitive metal and have integral end members 46 which are circular in cross-section. Extended laterally from the outer faces of the end members 46, of each of the shields 45, there are end aligned trunnions 47. The inner ends of the trunnions 47 are made integral with the end members 46, see particularly Fig. 7.

The outer ends of the trunnions 47 are extended turnably through complementary holes 51 formed in the side walls 41 of the frame 40. The holes 51 are arranged concentric with the rounded configuration of the grooves 37 so that the shields 45 will turn concentric with those grooves. The engagement of the trunnions 47 with the holes 51 leaves the shields 45 free to be turned between positions in which they are nested in the grooves 37 with their open sides face upward, as shown in Figs. 1, 3, 5 and 7. In that position, the frankfurters 52 to be grilled can be placed in end alignment in the shields 45. The inner peripheries of the shields 45 are of a size to snugly receive the frankfurters 52 and the outer peripheries of the shields 45 are of a size to snugly fit within the grooves 37. The shields 45 can be turned through 180 degrees into positions inverted over the tops of the grooves 37, as shown in Figs. 4, 11 and 12. In that position of the shields 45, the frankfurters 52 are dropped down into the respective grooves 37 and are completely covered over, protecting them from air borne dust and dirt. Furthermore, the shields act to confine the heat all about the frankfurters 52 to more evenly grill them with less heat loss accomplishing the grilling in a shorter time using less fuel. The shields 45 in their inverted positions also protect the frankfurters 52 from down drafts of cold air reducing the tendency to shrinkage.

The ends of the trunnions are inserted through the holes 51 of the side walls 41 of the frame 40 before the ends of those side walls are joined to the ends of the flange 38 or the ends of the intermediate arm 42.

Means is provided for turning the shields in unison through 180 degrees between positions nested down in the grooves 37 and positions inverted over the grooves and then back again. The turning means includes small pinions 53 which are fitted onto the outer ends of the trunnions 47 adjacent the outer faces of the side arms 41 of the frame 40. The pinions 53 are held against rotation relative to the trunnions 47 by means of cotter pins 54 inserted through aligned holes formed in the pinions 53 and the outer ends of the trunnions 47, see Figs. 7 and 12. In place of the cotter pins 54 set screws could be used to retain the pinions non-rotatively in position on the trunnions 47.

Rested on top of the pinions 53, there are racks 56 which are extended forwardly and rearwardly along the outer faces of the side arms 41 of the frame 40. The racks 56 are held down in meshing engagement with the pinions 53 by means of spaced L-shaped brackets 57. The brackets 57 have one of their arms secured within cutouts formed in the top edges of the side arms 41 by means of spaced screws 58. Those said one arms of the L-shaped brackets 57 then extend across the top faces of the racks 56. The other arms of the brackets 57 are depended along the outer faces of the racks to act in conjunction with the side walls 41 and the pinions 53 to hold the racks against any possible lateral movement while leaving them free for longitudinal movement in one direction or the other to respectively turn the pinions 53 and the respective shields 45.

The front ends of the racks 56 extend some distance beyond the front ends of the side arms 41 of the frame 40 and have insulator members 57 mounted on those extended front ends. An elongated handle 59 is extended transversely between the inner faces of the heat insulators 58 and are secured in position by means of screws 60. The handle 59 provides a convenient grip by which the two racks 56 can be moved to and fro in unison to turn the shields 45 and also provides a convenient grip by which the frame 40 can be pivoted upward about the screws 44. When the racks 56 are pushed inward and rearward, as shown in Fig. 5, the shields 45 will be nested in the grooves 37, as shown in Figs. 1, 3, 7 and 9. On the other hand, when the racks 56 are pulled outward, as shown in Fig. 6, the shields 45 will be inverted over the grooves 37, as shown in Figs. 4 and 11 to 13.

Means is provided for limiting longitudinal movement of the racks 56 to either of the two positions of the shields 45. The movement limiting means consists of spaced pins 61 and 62 mounted on the top face of the racks 56. The pins 61 and 62 are positioned to abut different ones of the L-shaped brackets 57 to restrict further movement of the racks 56 in the direction in which the racks were being moved. In the pushed in position of the racks 56, shown in Fig. 5, the pins 61 are shown in engagement with one of the brackets 57. In the pulled out positions of the racks 56, shown in Fig. 6, the pins 62 are shown in engagement with other of the brackets 57.

Channel-shaped housings 63, shaped of sheet metal, are mounted in position over the outer faces of the side arms 41 of the frame 40 to enclose the pinions 53 and the meshing racks 56 and related parts. The housings 63 are secured in position by means of screws 64 that are inserted down through the tops of the housings 63 and threaded into the side arms 41. The ends of the housings 63 are closed by integral inwardly bent end walls 65. The end walls 65 at the front ends of the housings are formed with cutouts 66 for passing the projecting front ends of the racks 56.

The formation of the grooves 37 and the shields 45 to be slightly less than one-half of a complete circle is an important feature of the present invention. With that formation, spaces 67 are left between the meeting edges of the grooves and the shields, as best shown in Figs. 11 and 12. Those spaces 67 provide clearance for the dissipation of steam generated by the grilling so that the frankfurters 52 will be truly grilled rather than steamed or boiled.

Means is provided for collecting the grease which is ejected from the frankfurters 52 during the grilling operation. That collecting means consists of elongated collecting containers 68 which are extended along the two sides of the heater assembly 20 from front to rear. The top edges of the containers 68 are formed with hooks 69 which are removably engaged over the top edges of the side walls of the box-like body 21 of the heater assembly 20. Thus, the collecting containers 68 are supported immediately below the side edges of the grill plate 30 at the open ends of the grooves 37. To discharge the collected grease from the ends of the grooves and beneath the side arms 41 of the frame 40, where they rest down on the flanges 36, the grill plate 30 at the open ends of the grooves 37 is formed with downwardly and outwardly inclined notches 70 which open through the outer sides of the flanges. Grease from the grooves 37 will flow down in the notches 70 and drop down into the collecting containers 68. To empty the containers 68 of the collected grease it is merely necessary to disengage the hooks 69 so that the containers 68 can be inverted to spill the grease. Having the containers 68 supported at the sides of the heater assembly 20 will keep the grease sufficiently warm so as not to harden and so remain sufficiently liquid to be spilled from the containers. To facilitate the flow of the grease toward the notches 70, the bottoms of the grooves 37 may be inclined slightly downward and outward from their centers, if that should be found desirable.

The manner of using the grill of the present invention is as follows:

First, of course, the heater element 23 of the heater assembly 20 is ignited if gas fired or energized if electrically operated to heat the grill plate 30. Then, the handle 59 is pulled outward drawing outward on the racks 56 and causing the shields 45 to be nested in their respective grooves 37 with their open sides facing upward, as shown in Figs. 1, 3, 7 and 9. The frankfurters 52 to be grilled are then placed in end alignment in the shields, as shown in Figs. 1 and 3. The handle 59 is then pushed inward moving the racks 56 inward and causing the shields 45 to be turned through 180 degrees into inverted positions over the respective grooves 37, as shown in Figs. 11 and 12. The frankfurters 52 are then spilled into the respective grooves 37 to be evenly grilled while completely covered. To remove the frankfurters 52 to be eaten, it is merely necessary to again pull outward on the handle 59 to cause the shields 45 to be turned back to their positions nested in the grooves 37. During turning of the shields 45 they slip beneath the frankfurters 52 which are again positioned in the open sides of the shields 45 to be easily selected for eating. To enable a prospective customer to better see the grilled frankfurters to select a desired one, the frame 40 together with all of the shields 45 and contained frankfurters can be lifted to the inclined position shown in Fig. 2 where all of the frankfurters will be exposed to view for selection by the customer. After a frankfurter 52 has been selected and removed, the shields 45 are then turned back to their inverted positions over the grooves 37 to again cover the remaining frankfurters.

It has been determined that repeated movement of the shields 45 between their open and closed positions relative to the respective grooves 37 causes the frankfurters 52 to be turned thus completely eliminating the need for hand turning the frankfurters individually. If the sale of frankfurters 52 is not brisk and it should be deemed necessary to turn the frankfurters it is merely necessary to quickly open and again immediately reclose the shields 45 to turn the frankfurters in one quick operation.

Cleaning of the inner sides of the shields 45 can be easily and quickly effected in the open positions thereof. To clean the grooves 37 of the grill plate 30, it is merely needed to raise the frame 40 about the screws 44 to completely expose the top surface of the grill plate 30. Cleaning of the rounded surfaces of the grooves 37 and the shields 45 can be effected using any desired cleaning implement or by using a special cleaning implement having elongated rounded cleaning members conformed to the roundness of the surfaces of the grooves 37 and the shields 45.

From the foregoing description, it is apparent that the grill of the present invention can be constructed as an integral unit with heater assemblies for sale as new equipment or can be constructed as replacement units to be substituted for the flat plate type of grill in common use.

While I have illustrated and described the preferred embodiment of my invention, it is to be understood that I do not limit myself to the precise construction herein disclosed and the right is reserved to all changes and modifications coming within the scope of the invention as set forth in the appended claims.

Having thus described my invention, what I claim as new and desire to secure by Letters Patent is:

1. A frankfurter grill including means to heat said grill, comprising a flat rectangular grill plate mounted over the source of heat, said grill plate having semicircular rounded grooves in its top face, a frame including sides and a back edge rested on and pivotally mounted along its back edge on said grill plate, a plurality of substantially semicircular shields one for each of said grooves extended rotatively between the sides of said frame with their open sides faced upward to receive the frankfurters to be grilled, and means for turning said shields in unison through 180 degrees to positions inverted over their respective grooves spilling the frankfurters into the respective grooves to be grilled.

2. A frankfurter grill including means to heat said grill, comprising a rectangular flat grill plate mounted over the source of heat, said grill plate having semicircular rounded grooves in its top face, a frame including sides and a back edge rested on and pivotally mounted along its back edge on said grill plate, a plurality of substantially semicircular shields one for each of said grooves extended rotatively between the sides of said frame with their open sides faced upward to receive the frankfurters to be grilled, and means for turning said shields in unison through 180 degrees to positions inverted over their respective grooves spilling the frankfurters into the respective grooves to be grilled, said grill plate having laterally extended flanges along its sides and front upon which said frame rests.

3. A frankfurter grill including means to heat said grill, comprising a flat rectangular grill plate mounted over the source of heat, said grill plate having semicircular rounded grooves in its top face, a frame including sides and a back edge rested on and pivotally mounted along its back edge on said grill plate, a plurality of substantially semicircular shields one for each of said grooves extended rotatively between the sides of said frame with their open sides face upward to receive the frankfurters to be grilled, and means for turning said shields in unison through 180 degrees to positions inverted over their respective grooves spilling the frankfurters into the respective grooves to be grilled, and means for supporting said grill plate in a slightly elevated position relative to said source of heat.

4. A frankfurter grill including means to heat said grill, comprising a flat rectangular grill plate mounted over the source of heat, said grill plate having rounded grooves in its top face, a frame rested on and pivotally mounted along its back edge on said grill plate, a plurality of substantially semicircular shields one for each of said grooves extended rotatively between the sides of said frame with their open sides faced upward to receive the frankfurters to be grilled, and means for turning said shields in unison through 180 degrees to positions inverted over their respective grooves spilling the frankfurters into the respective grooves to be grilled, said grooves and said shields being substantially semicircular and slightly less than one-half a complete circle leaving spaces between the adjacent edges of said grooves and said shields in the inverted position of said shields for the dissipation of steam resulting from grilling.

5. A frankfurter grill including means to heat said grill, comprising a flat rectangular grill plate mounted over the source of heat, said grill plate having semicircular rounded grooves in its top face, a frame including sides and a back edge rested on and pivotally mounted along its back edge on said grill plate, a plurality of substantially semicircular shields one for each of said grooves extended rotatively between the sides of said frame with their open sides faced upward to receive the frankfurters to be grilled, and means for turning said shields in unison through 180 degrees to positions inverted over their respective grooves spilling the frankfurters into the respective grooves to be grilled, said frame being substantially U-shaped having side arms extended along the sides of said grill plate at the open ends of said grooves and an intermediate arm extended between the front ends of said side arms.

6. A frankfurter grill including means to heat said grill, comprising a flat rectangular grill plate mounted over the source of heat, said grill plate having semicircular rounded grooves in its top face, a frame rested on and pivotally mounted along its back edge on said grill plate, a plurality of substantially semicircular shields one for each of said grooves extended rotatively between the sides of said frame with their open sides faced upward to receive the frankfurters to be grilled, and means for turning said shields in unison through 180 degrees to positions inverted over their respective grooves spilling the frankfurters into the respective grooves to be grilled, said frame being substantially U-shaped having side arms extended along the sides of said grill plate at the open ends of said grooves and an intermediate arm extended between the front ends of said side arms, and an upstanding flange integrally formed across the rear side of said grill plate, said side arms of said U-shaped frame being pivotally attached at their rear ends to the outer ends of said flange.

7. A frankfurter grill including means to heat said grill, comprising a flat rectangular grill plate mounted over the source of heat, said grill plate having semicircular rounded grooves in its top face, a frame rested on and pivotally mounted along its back edge on said grill plate, a plurality of substantially semicircular shields one for each of said frame grooves extended rotatively between the sides of said frame with their open sides faced upward to receive the frankfurters to be grilled, and means for turning said shields in unison through 180 degrees to positions inverted over their respective grooves spilling the frankfurters into the respective grooves to be grilled, said frame being substantially U-shaped having side arms extended along the sides of said grill plate at the open ends of said grooves and an intermediate arm extended between the front ends of said side arms, said turning means comprising end members formed on the outer ends of said shields, trunnions extended concentrically outward from said end members and extended turnably through complementary holes formed in said side arms of said frame, pinions non-rotatively mounted on the outer ends of said trunnions adjacent the outer faces of said side arms, and racks meshing with said trunnions and manually movable in one direction or the other to turn said pinions and in turn said shields.

8. A frankfurter grill including means to heat said grill, comprising a flat rectangular grill plate mounted over the source of heat, said grill plate having semicircular rounded grooves in its top face, a frame rested on and pivotally mounted along its back edge on said grill plate, a plurality of substantially semicircular shields one for each of said grooves extended rotatively between the sides of said frame with their open sides faced upward to receive the frankfurters to be grilled, and means for turning said shields in unison through 180 degrees to positions inverted over their respective grooves spilling the frankfurters into the respective grooves to be grilled, said frame being substantially U-shaped having side arms extended along the sides of said grill plate at the open ends of said grooves and an intermediate arm extended between the front ends of said side arms, said turning means comprising end members formed on the outer ends of said shields, trunnions extended concentrically outward from said end members and extended turnably through complementary holes formed in said side arms of said frame, pinions non-rotatively mounted on the outer ends of said trunnions adjacent the outer faces of said side arms, and racks meshing with said trunnions and manually movable in one direction or the other to turn said pinions and in turn said shields, said racks having their front ends extended beyond the front ends of said side arms, and a handle extended between the front ends of said racks by which they can be manually moved in unison in one direction or the other.

9. A frankfurter grill including means to heat said grill, comprising a flat rectangular grill plate mounted over the source of heat, said grill plate having semicircular rounded grooves in its top face, a frame rested on and pivotally mounted along its back edge on said grill plate, a plurality of substantially semicircular shields one for each of said grooves extended rotatively between the sides of said frame with their open sides faced upward to receive the frankfurters to be grilled, and means for turning said shields in unison through 180 degrees to positions inverted over their respective grooves spilling the frankfurters into the respective grooves to be grilled, said frame being substantially U-shaped having side arms extended along the sides of said grill plate at the open ends of said grooves and an intermediate arm extended between the front ends of said side arms, said turning means comprising end members formed on the outer ends of said shields, trunnions extended concentrically outward from said end members and extended turnably through complementary holes formed in said side arms of said frame, pinions non-rotatively mounted on the outer ends of said trunnions adjacent the outer faces of said side arms, and racks meshing with said trunnions and manually movable in one direction or the other to turn said pinions and in turn said shields, said racks having their front ends extended beyond the front ends of said side arms, and a handle extended between the front ends of said racks by which they can be manually moved in unison in one direction or the other, said handle being connected at its ends to heat insulation members in turn mounted on the front ends of said racks.

10. A frankfurter grill including means to heat said grill, comprising a flat rectangular grill plate mounted over the source of heat, said grill plate having semicircular rounded grooves in its top face, a frame rested on and pivotally mounted along its back edge on said grill plate, a plurality of substantially semicircular shields one for each of said grooves extended rotatively between the sides of said frame with their open sides faced upward to receive the frankfurters to be grilled, and means for turning said shields in unison through 180 degrees to positions inverted over their respective grooves spilling the frankfurters into the respective grooves to be grilled, said frame being substantially U-shaped having side arms extended along the sides of said grill plate at the open ends of said grooves and an intermediate arm extended between the front ends of said side arms, said turning means comprising end members formed on the outer ends of said shields, trunnions extended concentrically outward from said end members and extended turnably through complementary holes formed in said side arms of said frame, pinions non-rotatively mounted on the outer ends of said trunnions adjacent the outer faces of said side arms, and racks meshing with said trunnions and manually movable in one direction or the other to turn said pinions and in turn said shields, and means restricting movement of said racks to positions in which said shields are nested in said grooves or turned through 180 degrees into inverted positions over said grooves.

11. A frankfurter grill including means to heat said grill, comprising a flat rectangular grill plate mounted over the source of heat, said grill plate having semicircular rounded grooves in its top face, a frame rested on and pivotally mounted along its back edge on said grill plate, a plurality of substantially semicircular shields one for each of said grooves extended rotatively between the sides of said frame with their open sides faced upward to receive the frankfurters to be grilled, and means for turning said shields in unison through 180 degrees to positions inverted over their respective grooves spilling the frankfurters into the respective grooves to be grilled, said frame being substantially U-shaped having side arms extended along the sides of said grill plate at the open ends of said grooves and an intermediate arm extended between the front ends of said side arms, said turning means comprising end members formed on the outer ends of said shields, trunnions extended concentrically outward from said end members and extended turnably through complementary holes formed in said side arms of said frame, pinions non-rotatively mounted on the outer ends of said trunnions adjacent the outer faces of said side arms, and racks meshing with said trunnions and manually movable in one direction or the other to turn said pinions and in turn said shields, and channel-shaped housings removably mounted in position on the outer sides of the side arms of said frame covering said pinions and the meshing portions of said racks.

12. A frankfurter grill including means to heat said grill, comprising a flat rectangular grill plate mounted over the source of heat, said grill plate having semicircular rounded grooves in its top face, a frame including sides and a back edge rested on and pivotally mounted along its back edge on said grill plate, a plurality of substantially semicircular shields one for each of said grooves extended rotatively between the sides of said frame with their open sides faced upward to receive the frankfurters to be grilled, and means for turning said shields in unison through 180 degrees to positions inverted over their respective grooves spilling the frankfurters into the respective grooves to be grilled, and means for collecting the grease which collects within said grooves from the grilling of the frankfurters.

13. A frankfurter grill including means to heat said grill, comprising a flat rectangular grill plate mounted over the source of heat, said grill plate having semicircular rounded grooves in its top face, a frame including sides and a back edge rested on and pivotally mounted along its back edge on said grill plate, a plurality of substantially semicircular shields one for each of said grooves extended rotatively between the sides of said frame with their open sides faced upward to receive the frankfurters to be grilled, and means for turning said shields in unison through 180 degrees to positions inverted over their respective grooves spilling the frankfurters into the respective grooves to be grilled, and grease collecting containers removably mounted beneath the sides of said grill plate at the open ends of said grooves, said grill plate having notches at the ends of said grooves which are extended downward and outward for draining grease which collects in said grooves into said collecting containers.

14. The combination of claim 11 wherein said racks include pins mounted thereon and engaging said housings to restrict the movement of said racks to positions in which said shields are nested in said grooves or turned 180 degrees into inverted positions over said grooves.

References Cited in the file of this patent

UNITED STATES PATENTS

| Number | Name | Date |
|---|---|---|
| 2,185,979 | Dumas | Jan. 2, 1940 |
| 2,253,434 | Kernick | Aug. 19, 1941 |
| 2,584,061 | Stilphen | Jan. 29, 1952 |
| 2,604,842 | Dolce | July 29, 1952 |